(12) United States Patent
Geigel

(10) Patent No.: US 10,776,121 B2
(45) Date of Patent: Sep. 15, 2020

(54) SYSTEM AND METHOD OF EXECUTION MAP GENERATION FOR SCHEDULE OPTIMIZATION OF MACHINE LEARNING FLOWS

(71) Applicant: Atlantic Technical Organization, San Juan, PR (US)

(72) Inventor: Arturo Geigel, San Juan, PR (US)

( * ) Notice: Subject to any disclaimer, the term of this patent is extended or adjusted under 35 U.S.C. 154(b) by 59 days.

(21) Appl. No.: 16/235,591

(22) Filed: Dec. 28, 2018

(65) Prior Publication Data

US 2019/0138314 A1    May 9, 2019

Related U.S. Application Data

(63) Continuation-in-part of application No. 15/591,171, filed on May 10, 2017, now Pat. No. 10,338,963.

(51) Int. Cl.
| | |
|---|---|
| *G06F 9/451* | (2018.01) |
| *G06F 9/38* | (2018.01) |
| *G06F 11/07* | (2006.01) |
| *G06F 9/445* | (2018.01) |
| *G06N 20/00* | (2019.01) |
| *G06F 9/48* | (2006.01) |
| *G06F 9/50* | (2006.01) |
| *G06F 3/048* | (2013.01) |
| *G06N 5/00* | (2006.01) |

(Continued)

(52) U.S. Cl.
CPC ............ *G06F 9/3836* (2013.01); *G06F 3/048* (2013.01); *G06F 9/44505* (2013.01); *G06F 9/451* (2018.02); *G06F 9/4843* (2013.01); *G06F 9/5044* (2013.01); *G06F 11/0709* (2013.01); *G06N 5/003* (2013.01); *G06N 20/00* (2019.01); *G06N 3/006* (2013.01); *G06N 3/126* (2013.01)

(58) Field of Classification Search
CPC ......... G06F 17/30958; G06F 17/30398; G06F 17/30477; G06F 17/30516; G06F 17/30545; G06F 17/30563; G06F 17/30569; G06F 17/30917; G06F 9/451; G06F 9/5066
See application file for complete search history.

(56) References Cited

U.S. PATENT DOCUMENTS

| | | | |
|---|---|---|---|
| 2004/0117358 A1* | 6/2004 | von Kaenel | G06Q 40/08 |
| 2008/0222634 A1* | 9/2008 | Rustagi | G06F 9/5038 |
| | | | 718/100 |

(Continued)

*Primary Examiner* — Dong U Kim
(74) *Attorney, Agent, or Firm* — Eugenio J. Torres-Oyola; Victor M. Rodriguez-Reyes; Ferraiuoli LLC

(57) ABSTRACT

A distributed machine learning engine is proposed that allows for optimization and parallel execution of the machine learning tasks. The system allows for a graphical representation of the underlying parallel execution and allows the user the ability to select additional execution configurations that will allow the system to either take advantage of processing capability or to limit the available computing power. The engine is able to run from a single machine to a heterogeneous cloud of computing devices. The engine is capable of being aware of the machine learning task, its parallel execution constraints and the underlying heterogeneous infrastructure to allow for optimal execution based on speed or reduced execution to comply with other constraints such as allowable time, costs, or other miscellaneous parameters.

15 Claims, 16 Drawing Sheets

(51) Int. Cl.
*G06N 3/12* (2006.01)
*G06N 3/00* (2006.01)

(56) References Cited

U.S. PATENT DOCUMENTS

| | | | |
|---|---|---|---|
| 2009/0125796 A1* | 5/2009 | Day | G06F 9/451 |
| | | | 715/219 |
| 2010/0293147 A1* | 11/2010 | Snow | G06F 16/10 |
| | | | 707/640 |
| 2012/0210265 A1* | 8/2012 | Delia | G06F 3/0482 |
| | | | 715/771 |
| 2014/0007121 A1* | 1/2014 | Caufield | G06F 9/505 |
| | | | 718/103 |
| 2015/0261882 A1* | 9/2015 | Roberts | G06Q 10/067 |
| | | | 707/756 |
| 2015/0302075 A1* | 10/2015 | Schechter | G06F 16/9024 |
| | | | 707/641 |
| 2017/0039245 A1* | 2/2017 | Wholey, III | G06F 16/24568 |

* cited by examiner

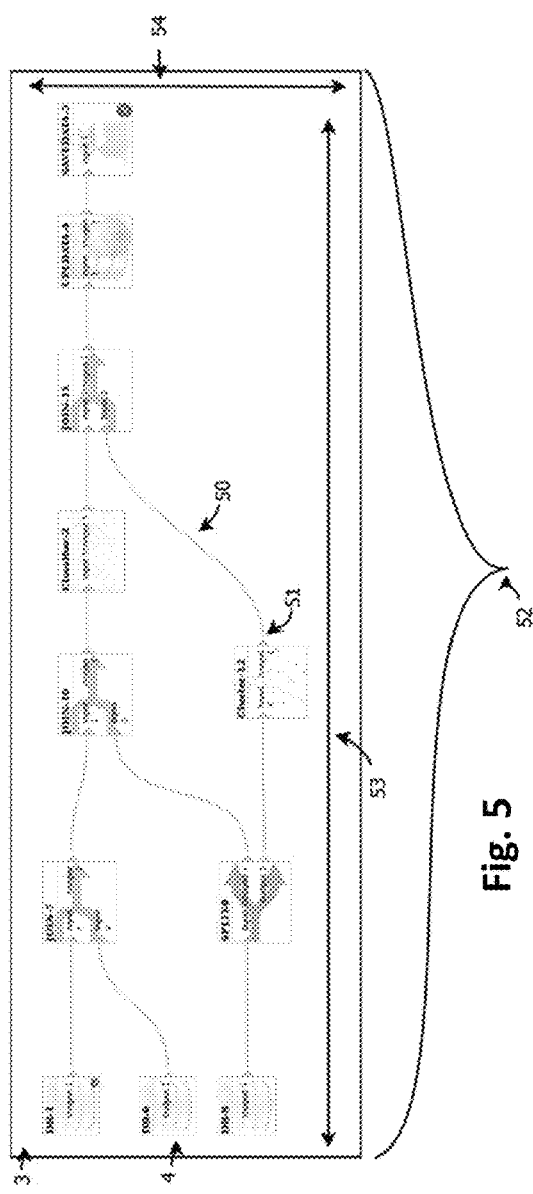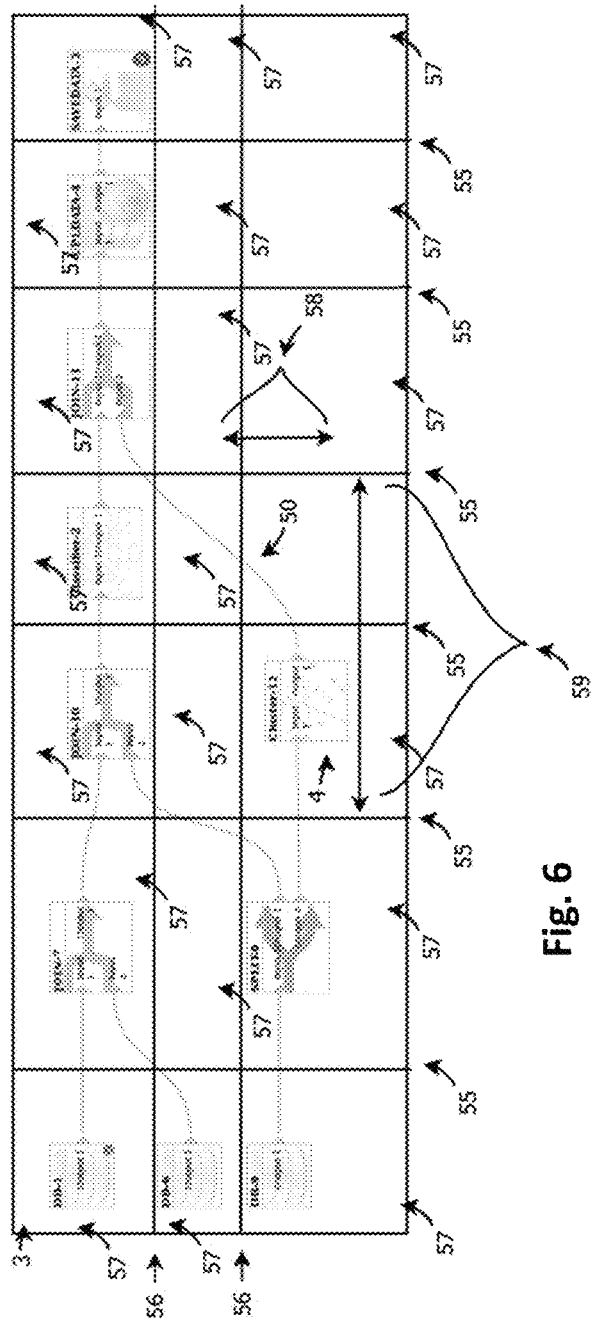
Fig. 5
Fig. 6

SYSTEM AND METHOD OF EXECUTION MAP GENERATION FOR SCHEDULE OPTIMIZATION OF MACHINE LEARNING FLOWS

STATEMENT REGARDING FEDERALLY SPONSORED RESEARCH AND DEVELOPMENT

N/A

RELATED APPLICATIONS

This application claims priority from U.S. patent application Ser. No. 15/591,171, filed on May 10, 2017, the contents of which are fully incorporated by reference.

BACKGROUND OF THE INVENTION

Field of the Invention

The present invention relates to the field of parallel execution. More specifically to execution of distributed machine learning tasks and the use of an execution graph to determine the parallel execution environment of the individual tasks.

Discussion of the Background

Data mining and machine learning are based on complex algorithms that require expertise for proper execution. This is more critical when parallel execution with complex preprocessing and multiple algorithms is required. This parallelization is often implemented in a clustered environment that resides on a cloud platform. Within the cloud platform it can be assumed that the overall parallelization takes place across heterogeneous server systems. The parallelization on such heterogeneous systems can range from multi-threaded systems to systems that are multi core/multiprocessors, have graphical processing units (GPUs) or even embedded systems.

The challenges to configuring these complex systems have been traditionally been tried at the level of the compiler at the programming language. This has the drawback of many assumptions and even constraints that are difficult to parallelize, especially in heterogeneous environments.

To tackle the complexities described above, several assumptions have to be made in concert that may be seen previously implemented independently but not as a unit. Each of these constraints will place particular constraints on the implementation and mixing them into a unit does not translate into in the sum of individual implementations. The first assumption not made is that programming is broken down into identifiable isolated modules. This isolation can be based on producing a specific operation on data. The second assumption not made by the previous art in parallel execution is that each module has to be identified in such a fashion so that it is a module of single instruction multiple data (SIMD) or atomic processing unit. The third assumption not made by the previous art is that the module interface has to be restrained in the number of inputs and outputs of each module and categorized accordingly. The fourth assumption is that an underlying program will control the movement of specific modules across the heterogeneous environment and is not coupled into the program. The fifth assumption is that modules need to have a normalized set of parameters s that predecessor module constraints and successor module constraints can be checked without making the architecture aware of the details of the particular internals of each module.

SUMMARY OF THE INVENTION

The present invention overcomes the limitations of the Prior art to determine the shortest path among all nodes, the present problem can be framed as finding the optimal path for execution among the components of data processing and machine learning algorithms. This is not limited to the actual data manipulation for output but preprocessing of the data, filtering values among other exemplary operations. The disclosed invention allows for the analysis of complex data flows and based on the data flow interface extract enough information to directly assess the underlying hardware and optimize the execution of the data flow. This process is a combinatorial problem that can have multiple constraints based not just on the data handling operation but also based on the detected hardware. While the interface could potentially override the system to impose a desired selective bias, the system searches the space of possible solutions to obtain a more precise and optimal implementation.

Therefore, one of the objectives of the present invention is to provide a mapping between data flow elements to an underlying computing platform in accordance with the principle of the present invention.

Another object of the invention is to optimize the processing of data in a cloud and parallel computing environment by optimizing the execution of a complex data flow taking into consideration not just the data flow but the underlying executing hardware in accordance with the principle of the present invention.

Another object of the invention is to provide an interface for the visualization of the mapping between execution flow and the server configuration in accordance with the principle of the present invention.

Another object of the invention is to provide an interface that also allows for the input of the user to change the underlying optimal configuration obtained by the process in the event that additional considerations might be required in accordance with the principle of the present invention.

The invention itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF DRAWINGS

The accompanying drawings, which are incorporated herein, constitute part of the specifications and illustrate the preferred embodiment of the invention.

FIG. 5 shows a representative example of a processing flow in the interface system in accordance with the principles of the present invention.

FIG. 6 shows a segmentation of the interface system map for parallel execution in accordance with the principles of the present invention.

DESCRIPTION OF THE PREFERRED EMBODIMENT

Figure 1:
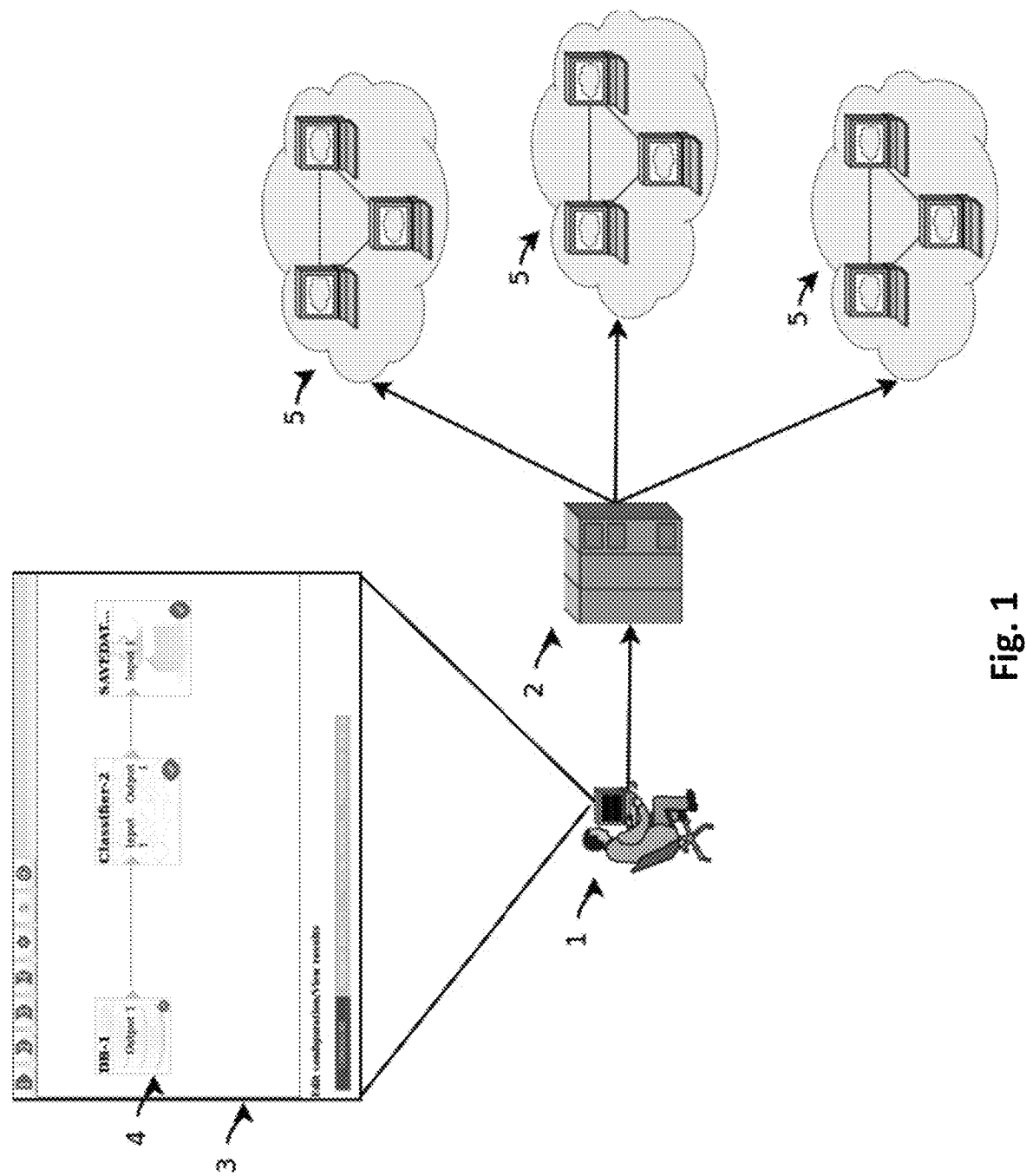
FIG. 1 shows a typical embodiment of the actual system that performs the functions in accordance with the principles of the present invention.

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

An exemplary computing system for implementing the embodiments and includes a general purpose computing device in the form of a computer 1. Components of the computer 1 may include, but are not limited to, a processing unit, a system memory, and a system bus that couples various system components including the system memory to the processing unit. The system bus may be any of several types of bus structures including, but not limited to, a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The computer 1 typically includes a variety of computer readable media. Computer readable media can be any available media that can be accessed by the computer 1 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within computer 1, such as during start-up, is typically stored in ROM. RAM typically contains data and/or program modules that are immediately accessible to and/or presently being operated on by processing unit. By way of example, and not limitation, FIG. 1 illustrates operating system 1, central processing system 2, and data base.

The computer 1 and central processing system 2 may also include other removable/non-removable, volatile/nonvolatile computer storage media. The computer 1 and central processing system 2 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, or the like. The hard disk drive is typically connected to the system bus through a non-removable memory interface such as interface, and magnetic disk drive and optical disk drive are typically connected to the system bus by a removable memory interface, such as interface.

The drives and their associated computer storage media, discussed above, provide storage of computer readable instructions, data structures, program modules and other data for the computer 1. A user may enter commands and information into the computer 1 through input devices such as a tablet or electronic digitizer, a microphone, a keyboard and pointing device, commonly referred to as a mouse, trackball or touch pad. Other input devices (not shown) may include a joystick, game pad, satellite dish, scanner, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device 1 is incorporated, such as in a tablet-type personal computer. In addition, computers such as the computing device 1 may also include other peripheral output devices such as speakers and printer, which may be connected through an output peripheral interface or the like. A display device, for purposes of this patent application can include an e-paper display, a liquid crystal display or the like.

The computer 1 may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections depicted in FIG. 1 include a local area network (LAN) and a wide area network (WAN), but may also include other networks. Such networking environments are commonplace in offices, enterprise-wide computer networks, intranets and the Internet. For example, in the subject matter of the present application, the computer system 1 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms. When used in a LAN or WLAN networking environment, the computer 1 is connected to the LAN through a network interface or adapter. When used in a WAN networking environment, the computer 1 typically includes a modem or other means for establishing communications over the WAN, such as the Internet. The modem, which may be internal or external, may be connected to the system bus via the user input interface or other appropriate mechanism. In a networked environment, program modules depicted relative to the computer 1, or portions thereof, may be stored in the remote memory storage device. By way of example, remote application programs may reside on memory device. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware.

A wireless network appropriate for some embodiments herein is shown in FIG. 1. The wireless network includes a computer or base station 1, which can be coupled to a central processing system or server 2. Base station 1 interacts with a plurality of wireless components, which may be receivers only (or with receive and transmit capability), designed to receive real time images and associated data as correlated and transmitted by server 2. Components interact with base station 1 via wireless connection. The wireless connection could include cellular modems, a radio-frequency (RF) methods and/or wireless local area network (WLAN). A wireless connection may include a portion of the route between the endpoints transmitted via a wired line, e.g. a fiber Internet backbone or an internal wired network coupling the server with wireless transmission hardware or base station.

Furthermore, FIG. 1 Shows a typical embodiment of the actual system that performs the functions of the proposed invention. The system is accessed by a user through a terminal 1. The terminal 1 is connected to a central processing system 2 that contains memory components and processing units. The terminal accesses the functionality of the of the central processing system via an interface system 3 that has functionality icon 4. The central processing system 2 will process the information given by the interface system 3 and a functionality icon 4 to a distributed architecture 5.

Figure 2:
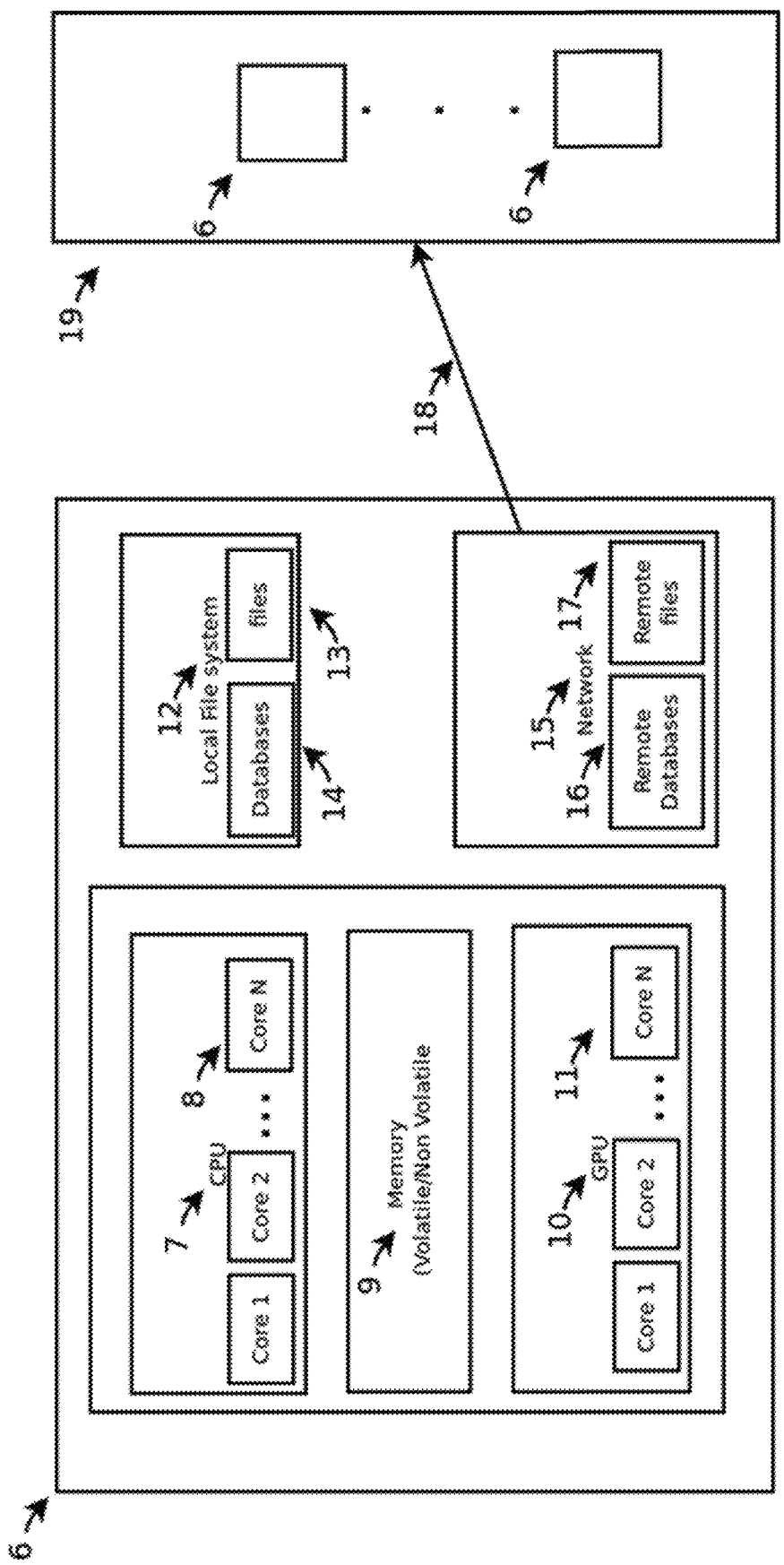
FIG. 2 describes the physical layout of the typical execution environment on which the parallel execution will take place in accordance with the principles of the present invention.

FIG. 2 describes the physical layout of the typical execution environment on which the parallel execution will take place. A typical embodiment consists of a computer system 6 that contains a CPU 7 with a number of N cores 8. The n cores 8 is capable of doing multi-threading tasks on the CPU 7. The computer system 6 also contains a memory system capable of storing information for processing by the CPU 7. The computer system 6 can also contain a compute capable GPU 10 with a number of N cores 11. Computer system 6 has a local file system 12 that can contain a number of files 13 and possible a database system 14. Computer system 6 includes a network interface 15 that is able to access a remote database system 16 or a remote file system 17. Access to remote database system 16 and/or a remote file system 17 is done through a network card in network 15 via a connection 18 to a cloud infrastructure 19. The cloud infrastructure 19 contains up to n computer systems 6.

Figure 3:
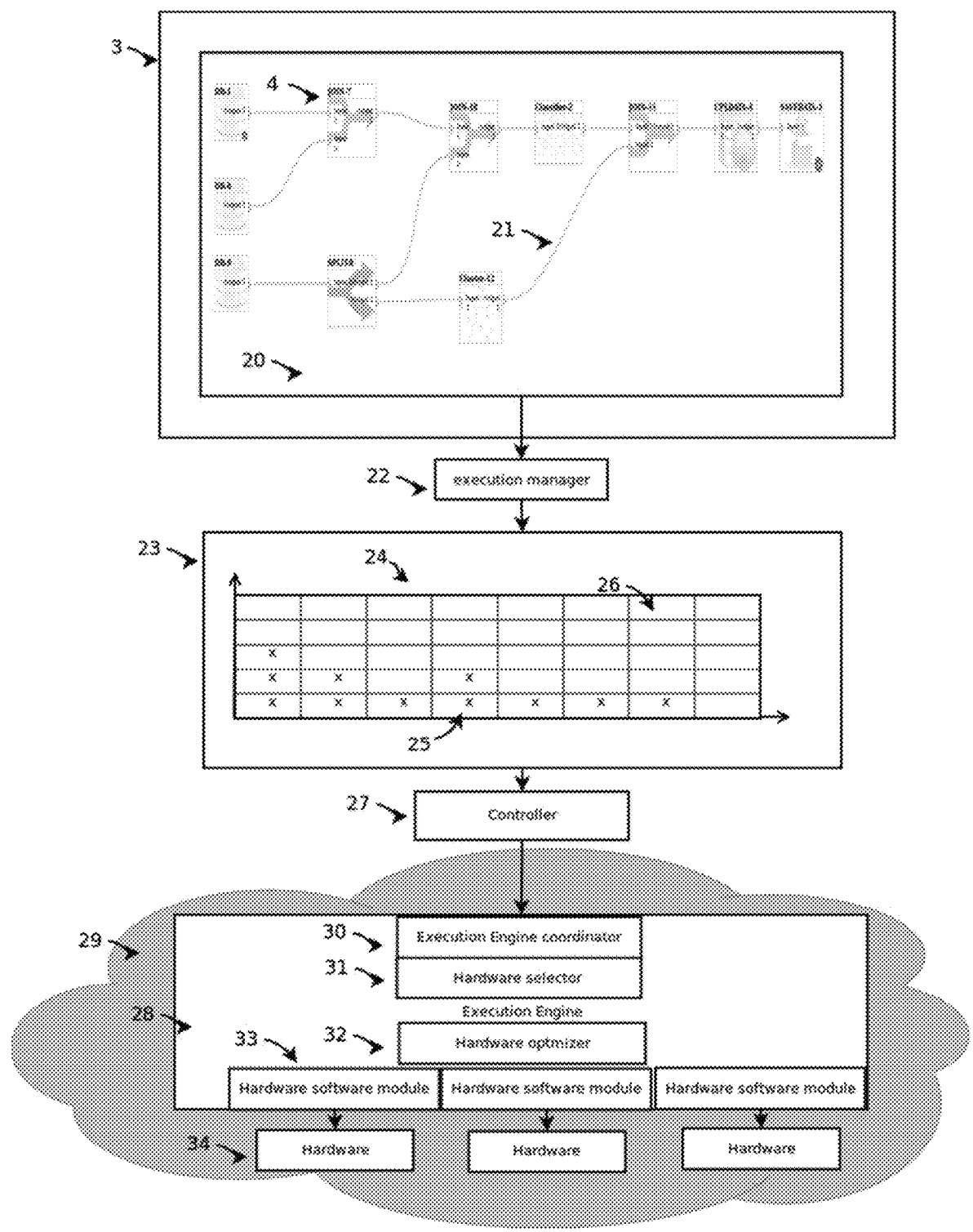
FIG. 3 displays a graphical representation of the major components of the proposed system in accordance with the principles of the present invention.

FIG. 3 displays a graphical representation of the major components of the proposed system. The system starts with the interface system 3 that has functionality icon 4 that have the configuration that the system will execute. an execution program 20 is specified by the functionality icon 4 connected via a link 21. Once the execution program 20 is finished the program will be forwarded to an execution manager 22. The execution manager 22 will reside on the central processing system 2 which is a typical Computer system 6. The execution manager 22 will produce an execution map 23 based on the execution program 20. The execution map 23 contains an execution matrix 24 that will store the order of the execution. Each entry in the execution matrix 24 is assigned an execution slot 25 that can be filled with an execution entry 26 that corresponds to functionality icon 4. Once the execution map 23 is completed it is passed to a controller 27 that also resides central processing system 2. The controller coordinates the execution with an execution engine 28 across the cloud environment 29. Cloud environment 29 is composed of cloud infrastructure 19 that contains up to n computer systems 6. The controller 27 communicates to an execution engine coordinator 30 that resides on one of n computer system 6 of cloud environment 29. The execution engine coordinator 30 uses a hardware selector 31 to discriminate which component of computer systems 6. For example, hardware selector 31 can choose between execution between the n cores 8 on the CPU 7 or use GPU 10 or other processing technology. Once hardware selector 31 chooses the particular processing technology, the hardware selector 31 selects a hardware optimizer 32 which coordinates with a hardware software module 33 that contains the necessary routines to interact with a hardware 34.

Figure 4:
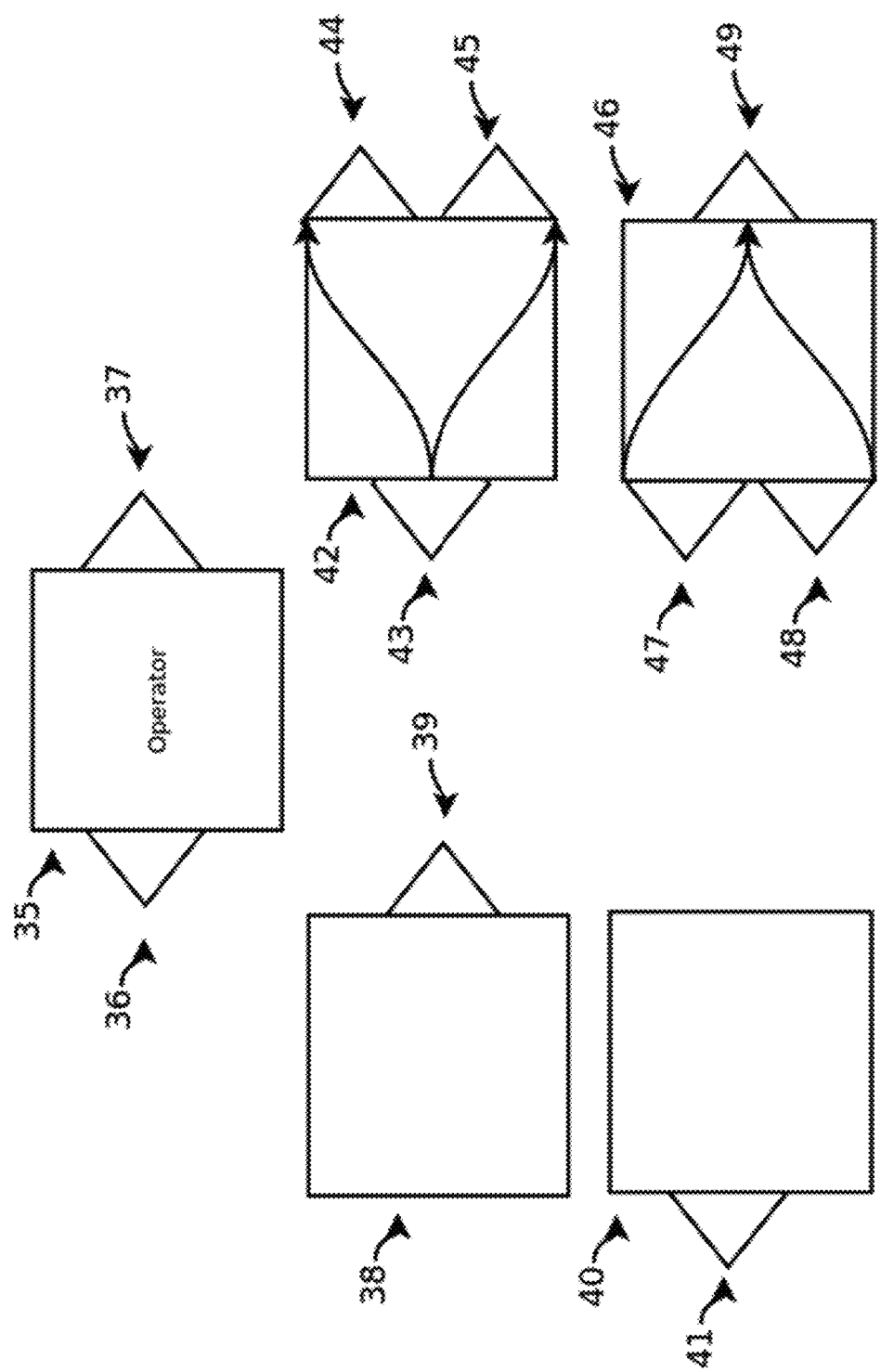
FIG. 4 shows the categories of graphical operator elements in accordance with the principles of the present invention.

FIG. 4 shows the categories of graphical operator elements. Functionality icon 4 of interface system 3 can be divided into several icon types with specific functions that are independent of the particularity of the operations they are required to perform. FIG. 4 shows an operator 35 that has an input link connector 36 and a output link connector 37. The operator 35 represents an operation that has one input and one output. For example this may represent a single instruction single datum (SISD) or single instruction multiple data operation (SIMD). An operator 38 contains an output link connector 39 representing a source operation. A source operation can be usually be taken but not limited to data extraction from a source that can be a database, file, web service, or other similar operation that does not accept an input to the operator. An operator 40 contains an input link connector 41 representing a destination operation. A destination operation can be usually be taken but not limited to data storage such as insertion to a database, file, web service or other operation that only accepts an input to the operator. An operator 42 represents a split operation. The operator 42 has an input link connector 43 that represents the input to the system. The operator 42 also contains an output link connector 44 and an output link connector 45. The split operation done by operator 42 takes one input through input link connector 43 and performs a split of the data into separate streams that are redirected to output link connector 44 and output link connector 45. Finally, an operator 46 represents a join operation. The operator 46 has an input link connector 47 and an input link connector 48. The operator 46 also contains an output link connector 49. The join operation carried out by operator 46 takes two data streams through input link connector 47 and input link connector 48 and joining the data stream into a single output that is sent to output link connector 49.

FIG. 5 shows a representative example of a processing flow in the interface system 3 using functionality icon 4 along with a link 50. Link 50 is connected to functionality icon 4 via a link connector 51. The interface system 3 spans a canvas 52 with a width 53 and height 54 where you can place a plurality of icon 4 and link 50.

FIG. 6 shows a segmentation of the interface system map for parallel execution manager 22. The plurality of functionality icon 4 and link connector 51 are segmented via a vertical line 55 and a horizontal line 56 into a cell 57. Empty cells can create a vertical slack 58 or a horizontal slack 59 in the interface system map that will be used by the controller 27.

Figure 7:
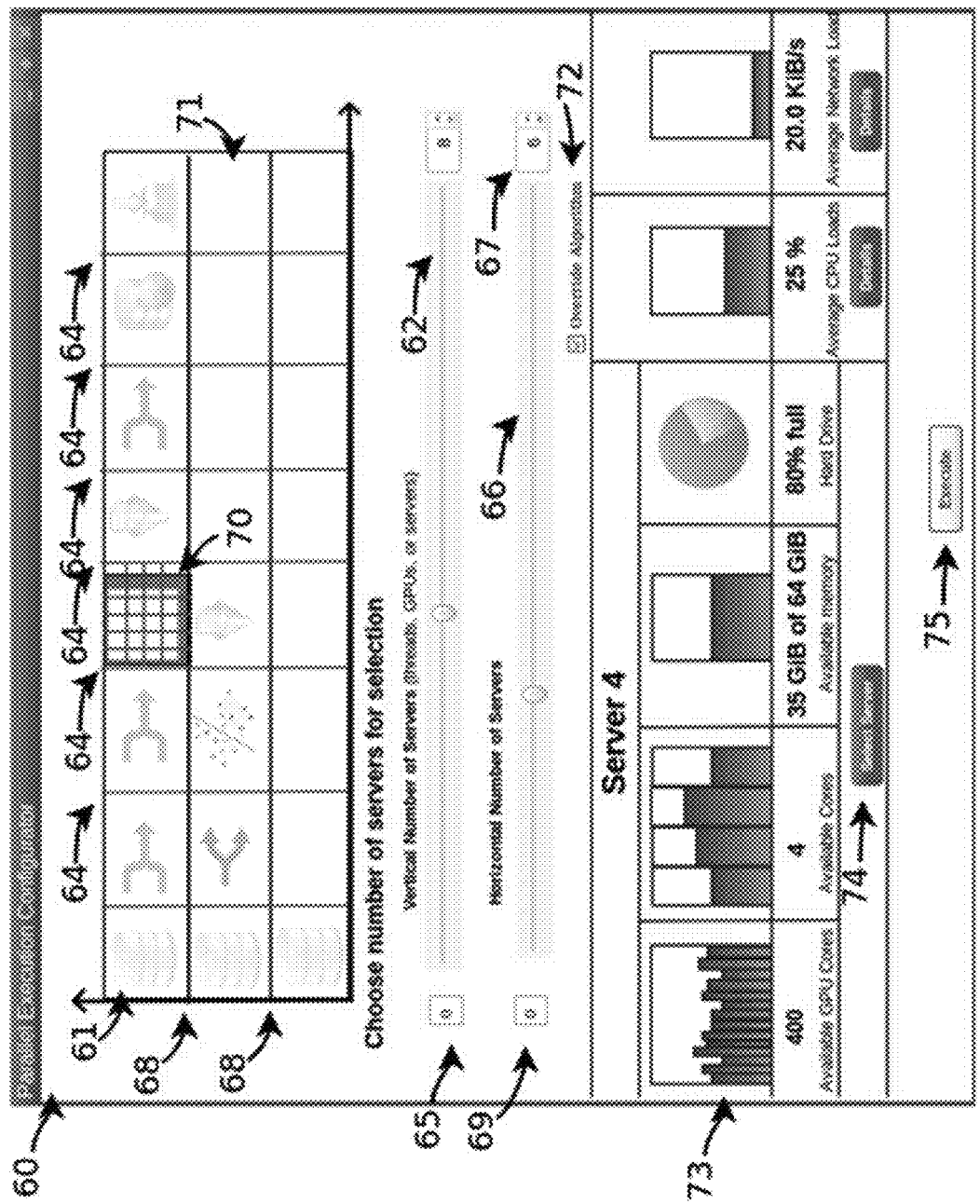
FIG. 7 shows a graphical user interface to control the parallel execution in accordance with the principles of the present invention.

FIG. 7 shows a graphical user interface to control the parallel execution. A graphical user interface 60 shows a graphical overlay representation of the interface system 3 and execution matrix 24 in a graphical execution map 61. A horizontal scrollbar 62 or similar interfaces such as number input 63 or similar specification interface controls vertical processing lines 64. The number input 65 controls the minimum number of vertical processing lines 64. A horizontal scrollbar 66 or similar interfaces such as number input 67 or similar specification interface controls horizontal processing lines 68. The number input 69 controls the minimum number of horizontal processing lines 68. The number input 65 controls the minimum number of vertical processing lines 64. By clicking on the graphical execution map 61 a focus on a sub grid 70 allows specification of sub processing within a processing unit 71 of graphical execution map 61. The processing unit 71 determined by vertical processing lines 64 and horizontal processing lines 68 constitutes a single processing unit such as a server or processor, while individual blocks in sub grid 70 constitute threads or GPU threads or equivalent sub processing units. The user interface 60 allows a display of the initial segmentation of processing of execution map 23 done by the automated process. This automated process can be overridden by changing the state on interface check box 72 or similar interface that will allow manual control over the algorithm by using horizontal scrollbar 62, number input 65, horizontal scrollbar 66, number input 67, number input 69 or similar input device. Graphical user interface 60 also has a graphical display 73 gives visual queues of measurements on which to base the settings of the parallel processing inputs. Graphical user interface 60 also has a button 74 that allows the graphical display 73 to show particular information of any targeted computational device represented by processing unit 71. Finally a button 75 allows for a controlled submission of the configuration to the execution engine.

Figure 8:
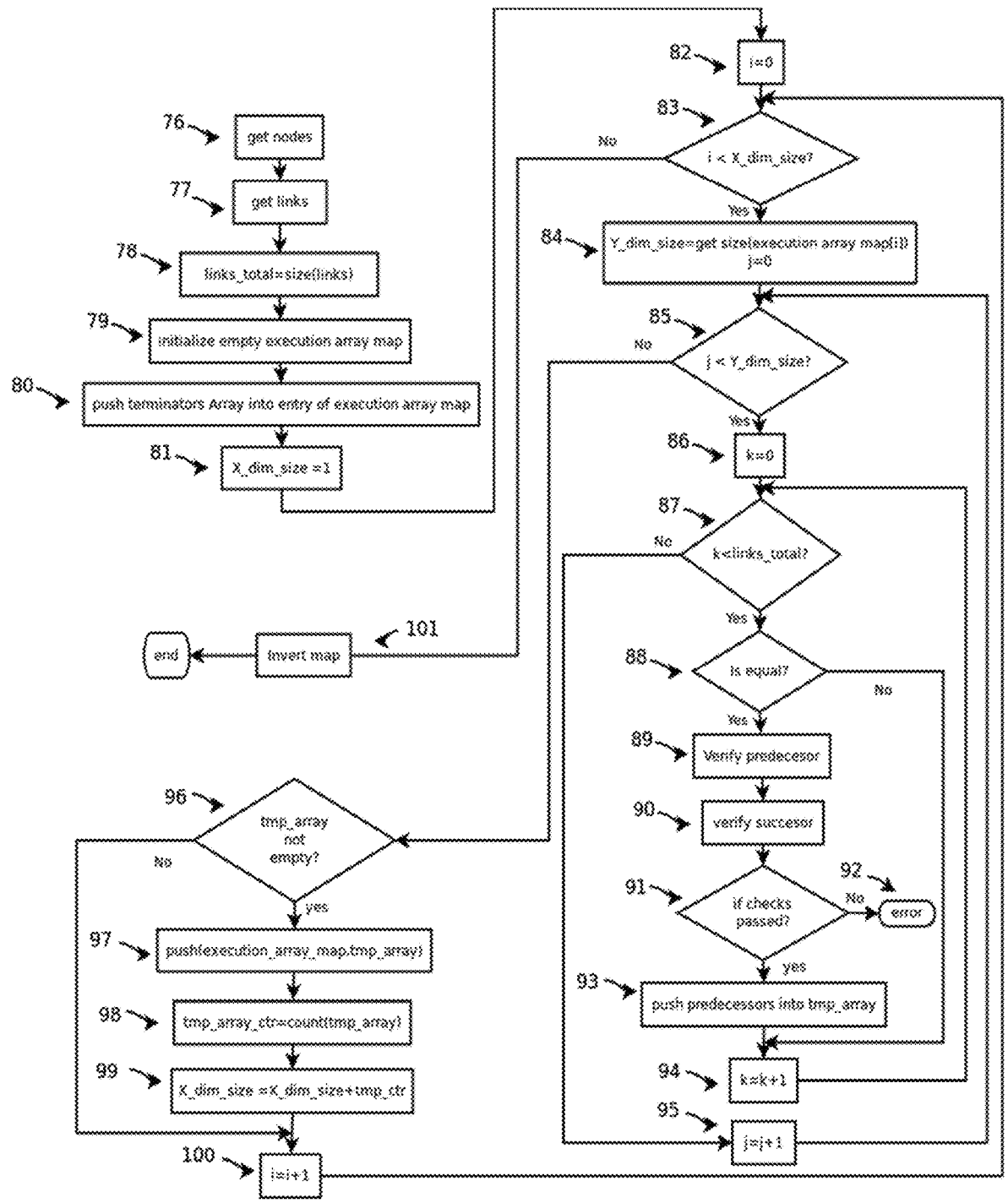
FIG. 8 shows a flowchart of the execution map validation in accordance with the principles of the present invention.

FIG. 8 shows a flowchart of the execution map validation and execution element placement in execution map. The process starts at a step 76 that gets the nodes from the configuration made by the user. The step 76 is followed by a step 77 that retrieves the links from the configuration made by the user. The step 77 allows the process to calculate the total number of links and is stored as links total through a step 78. Once step 78 is done a step 79 initializes the execution array map that represents execution map 23. Step 79 finishes giving way to a step 80 that isolates terminators from the nodes extracted in step 76 and makes an array that will be pushed into the empty execution array map initialized in step 79. If the extracted array of nodes is more than one the pushed array will convert the empty execution array map into a bi dimensional array. This can also happen at any point in time if more than one element is inserted in the same column within the empty execution array map. If this step is not executed because there are no terminators the platform returns an error. A step 81 follows step 80 where the X dimension size of the array is initialized to after the terminators are inserted into the array. Step 81 is followed by a step 82 where the counter to traverse the execution array map is set to zero. In a step 83 that follows step 82, the counter to traverse the execution array map is compared to the X dimension size to see if there is a need to continue the execution. Positive evaluation of step 83 gives way to a step 84 where the Y dimension for that specific X coordinate in the map is determined and the Y dimension counter is set to zero. The Y dimension counter and the size of the current Y dimension of step 84 are used in a step 85 where the counter is compared to the Y dimension. If the Y dimension counter is less than the Y dimension the process at step 85 continues to a step 86 that initializes the counter that loops through the total number of links based on the decision made in a step 87. Step 87 is followed by a step 88 that does the comparison that matches the current element under consideration with the links and node array to extract the information. The information extracted in step 88 which is the elements position in the graph and its predecessor and successor is used in a step 89 to verify predecessor dependencies and in a step 90 to verify successor dependencies. After step 90 dependency check a step 91 is a conditional that if the verifications of step 89 and step 90 fails then an error step 92 executes. If step 91 is successful then a step 93 stores the entry into a temporary array. Finishing step 93 and also the negative decision outcome of step 89 causes a step 94 to increase the counter for the links travel. A step 95 is the increment of counter for the Y dimension traversal that comes about through a negative decision outcome in step 87. A step 96 is the result of a negative outcome of step 85 and consist of determining whether the temporary array is empty or not. If a not empty condition exist in step 96 the process will go to a step 97 where the temporary array is pushed into the execution array map. A step 98 follows step 97 where the temporary array counter takes the value of the number of elements pushed into the temporary array and the x dimension size is increased accordingly in a step 99. Step 99 and a negative outcome of step 96 gives way to a step 100 where the counter for the X dimension is increased. A step 101 occurs if a step 83 determines that the X dimension is finished being processed and terminates the flow by inverting the execution array map so that it can be read from beginning to end and not otherwise.

Figure 9:
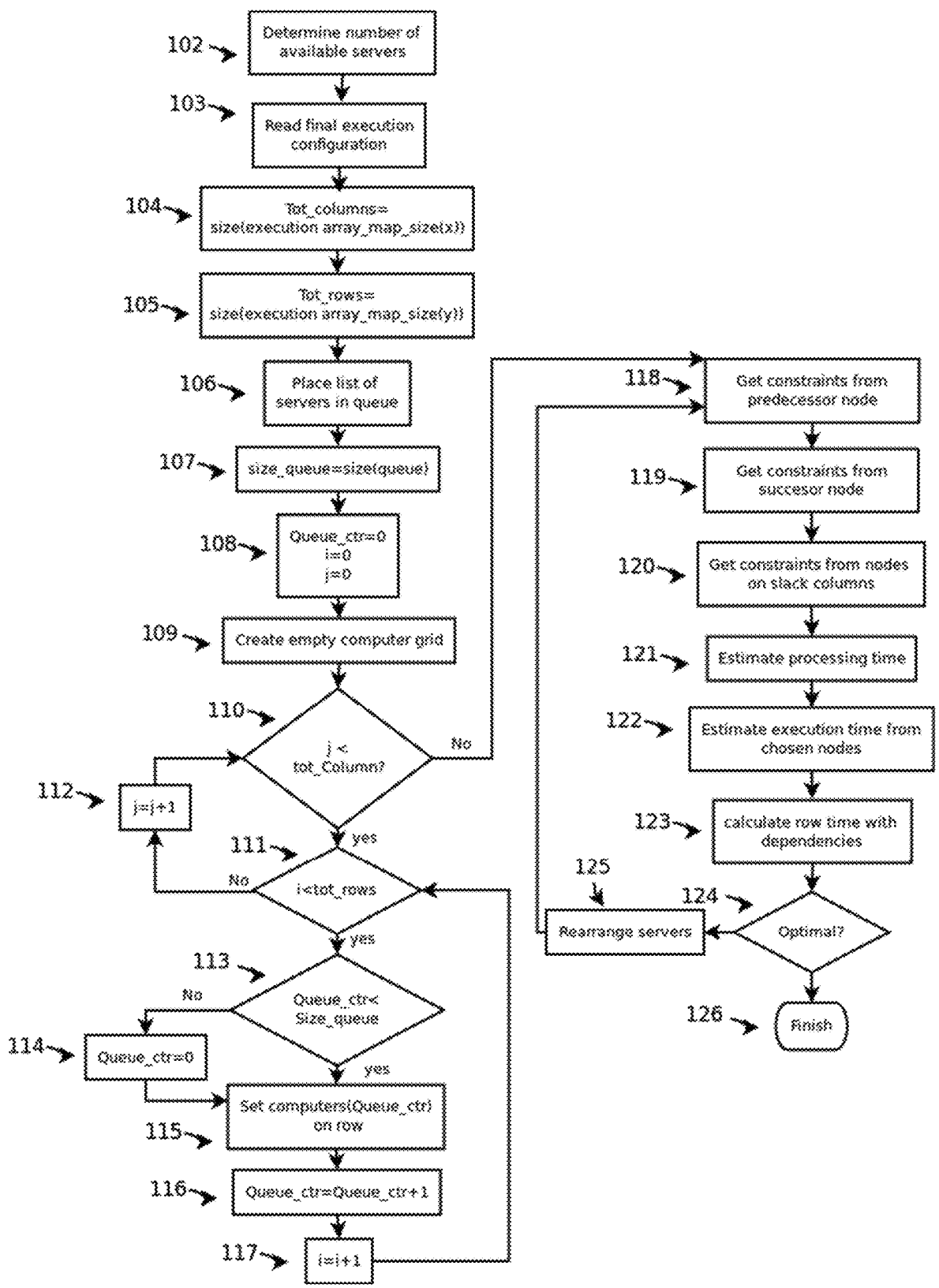
FIG. 9 shows a flowchart of the execution map analysis process done by the execution manager of optimal repositioning in accordance with the principles of the present invention.

FIG. 9 shows a flowchart of the execution map analysis process done by the execution manager of optimal repositioning. A step 102 determines the number of available servers that have been configured to carry out the execution of the process. Once step 102 is concluded a step 103 reads the execution configuration that is the result of the process described in FIG. 8. From the execution array map extracted from step 103 the total number of columns is extracted in a Step 104 and the total number of rows in a step 105. Once step 105 is completed the process continues to a step 106 that places the list of available servers in a queue. Each entry of the queue represents one of the available servers from step 102. A step 107 stores in a variable the size of the queue created in step 106. Step 107 is followed by a step 108 that initializes the queue counter, the row counter and the column counter to zero. After step 108 a step 109 creates and empty grid using the sizes determined in step 104 and step 105 that will mp each execution element of the execution array map to the available servers. Following step 109, a step 110 enters a decisional loop to compare the column counter initialized in step 108 with the total number of columns calculated in step 104. If the decision of step 110 is positive, a step 111 is entered where another decisional loop is entered to compare the row counter from step 108 with the total number of rows from step 105. If the decision from step 111 is negative a step 112 increments the column counter and returns to step 110. If the decision of step 111 is positive then a step 113 that is a comparison between the queue counter and the total size of the queue is made. If the decision is negative then a step 114 resets the queue counter to zero to start again from the initial entry of the queue. Step 113 and step 114 are followed by a step 115 that places the computer entry of the current queue counter on the computer grid of step 109 at the current specified row and column specified by the row counter and column counter if it has a processing step from the execution array map. Step 115 is followed by a step 116 where the queue counter is incremented and a step 117 increments the row counter and returns to the conditional of step 111. Step 110 also branches upon a negative outcome to a step 118 where the process fetches the constraints from each of the nodes predecessors. A step 119 follows steps 118 and retrieves constraints from each of the nodes successors. Steps 119 and step 120 are then used in a step 120 where the constraints are the extracted from the current nodes that are on the slack columns as explained in FIG. 6. A step 121 follows step 120 where the time required for execution is estimated for each of the elements of the execution array map. A step 122 takes into account the information from step 119, step 120, and step 121 to determine the execution time and the dependencies that are imposed on each of the selected nodes. On the preferred embodiment special emphasis is placed on elements that have slack columns spaces available for possible rearrangement to maximize execution performance. A step 123 is derived from the information of step 122 by contemplating the cumulative time across each of the rows of the execution array map with the processing capability of each row of the computer grid. From the information gathered on the performance of each row in step 123 a step 124 determines if the configuration is optimal or not based on previously configured performance constraints or previous configuration iterations. If the decision is negative a step 125 rearranges the map leveraging the slack columns or server rearrangement. Server rearrangement can be made based on the capabilities of the server or other constrains placed on the execution such as data transfer time across servers or server availability among other factors. The actual decision of placement can be carried out but not limited to linear programming, genetic algorithms, swarm optimization or other optimization algorithm. Step 124 eventually arrives at an optimal decision based on convergence criteria or number of iterations and the process continues to a step 126 where it terminates with the candidate configuration.

Figure 10:
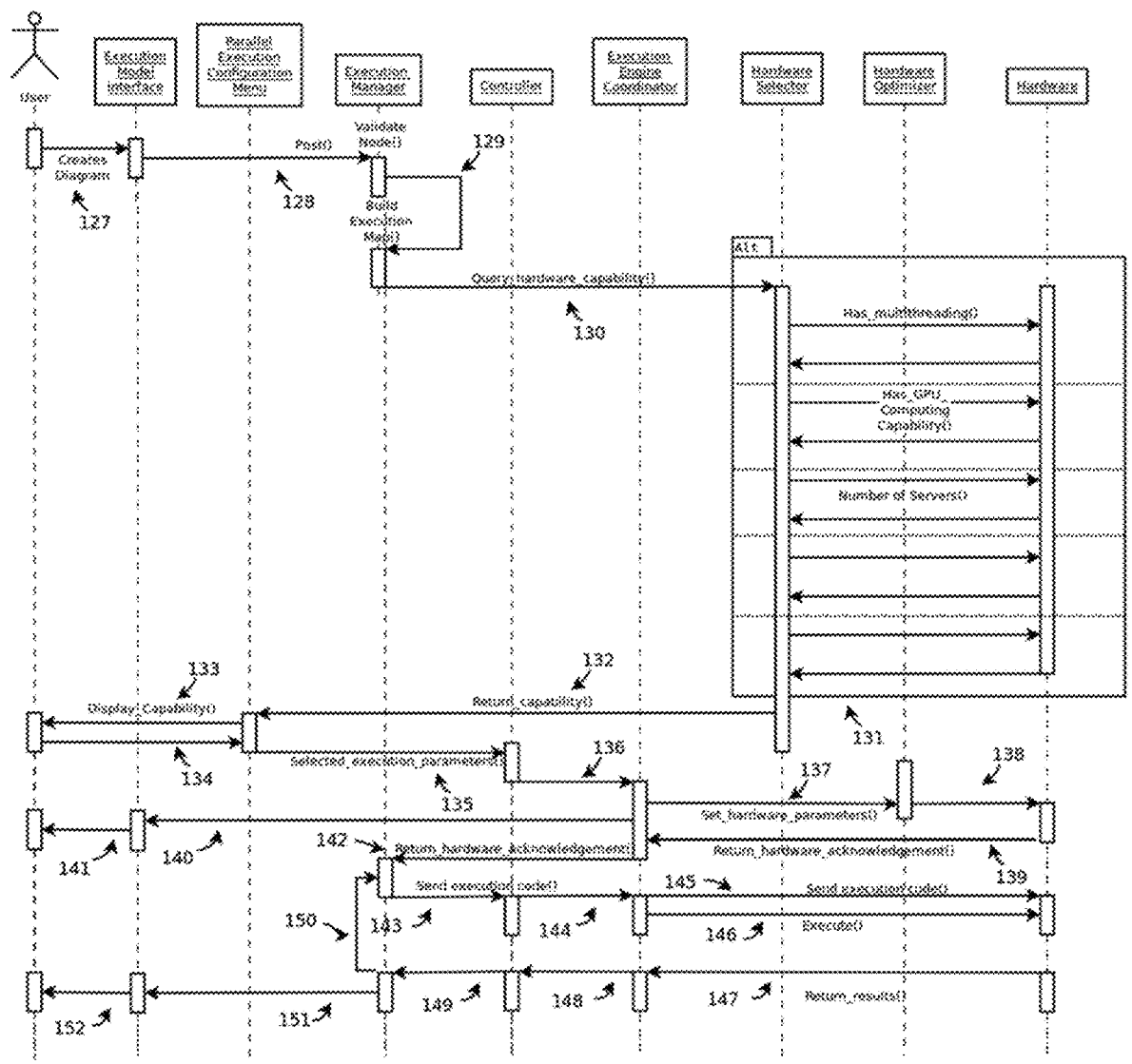
FIG. 10 shows a sequence diagram of the infrastructure components that implement the process in accordance with the principles of the present invention.

FIG. 10 shows a sequence diagram of the infrastructure components that implement the process. A step 127 is when the user creates a diagram of an execution through the execution model interface represented as interface system 3. A step 128 follows step 127 where the user sends the completed diagram to the execution manager for processing. The execution manager executes the flow described in FIG. 8 through a call to itself in a step 129 carried out in the execution engine 28. After completion of step 129 the execution manager sends a hardware capability query to the hardware selector in a step 130. A step 131 follows message request of step 130 by querying the hardware for multi-threading, GPU and number of servers capabilities. The process is not limited to these capabilities and could contemplate additional hardware parameters such as hard disk space, memory, among others. Once step 131 is finished a step 132 returns the capabilities along with the execution map to the parallel execution configuration menu as shown in graphical user interface 60. The parallel execution configuration menu also executes the process described in FIG. 9 and passes the information from step 132 to the user in a step 133. The user decides if the execution given by step 133 is acceptable or changes the configuration and sends its final decision to the parallel execution configuration menu in a step 134. The parallel execution configuration menu sends the users request of step 134 through a step 135 to the controller. The controller evaluates that constraints have not been validated and sends the information of step 135 to a step 136 that is received by the execution engine coordinator. The execution engine coordinator divides the information from step 136 into individual messages that are sent in a step 137 to each server's hardware optimizer. The hardware optimizer uses the information of step 137 to determine optimal parameters based on the hardware configuration and sends a message in a step 138 to set the hardware settings appropriately. The server's hardware platform responds to step 138 to the execution engine coordinator with a message of hardware acknowledgement in a step 139. The execution engine receives the message of step 139 and sends the message to the execution model interface in a step 140 and is received by the user by the interface in a step 141. At the same time the execution engine coordinator sends the hardware acknowledgement to the execution manager in a step 142. The execution manager then processes step 142 and sends the execution code to the controller in a step 143 and in turn the controller sends it to the execution engine coordinator in a step 144. The execution engine coordinator takes the code from step 144 and sends it to the specific server or hardware for execution in a step 145. Once the step 145 is completed the execution engine coordinator sends the execute command to the system, server or hardware in a step 146. The platform server or hardware executes the code from step 145 and once it is finished it sends the results to the execution engine coordinator in a step 147. The results form step 147 are forwarded to the controller in a step 148 and in turn the controller to the execution manager in a step 149 and if the columns of the execution array map are not finished a step 150 takes place where the cycle from step 144 to step 149 is repeated. Once the execution is completed the cumulative results from step 149 are then forwarded in a step 151 to the execution model interface and in turn a step 152 will display the results to the user.

Figure 11:
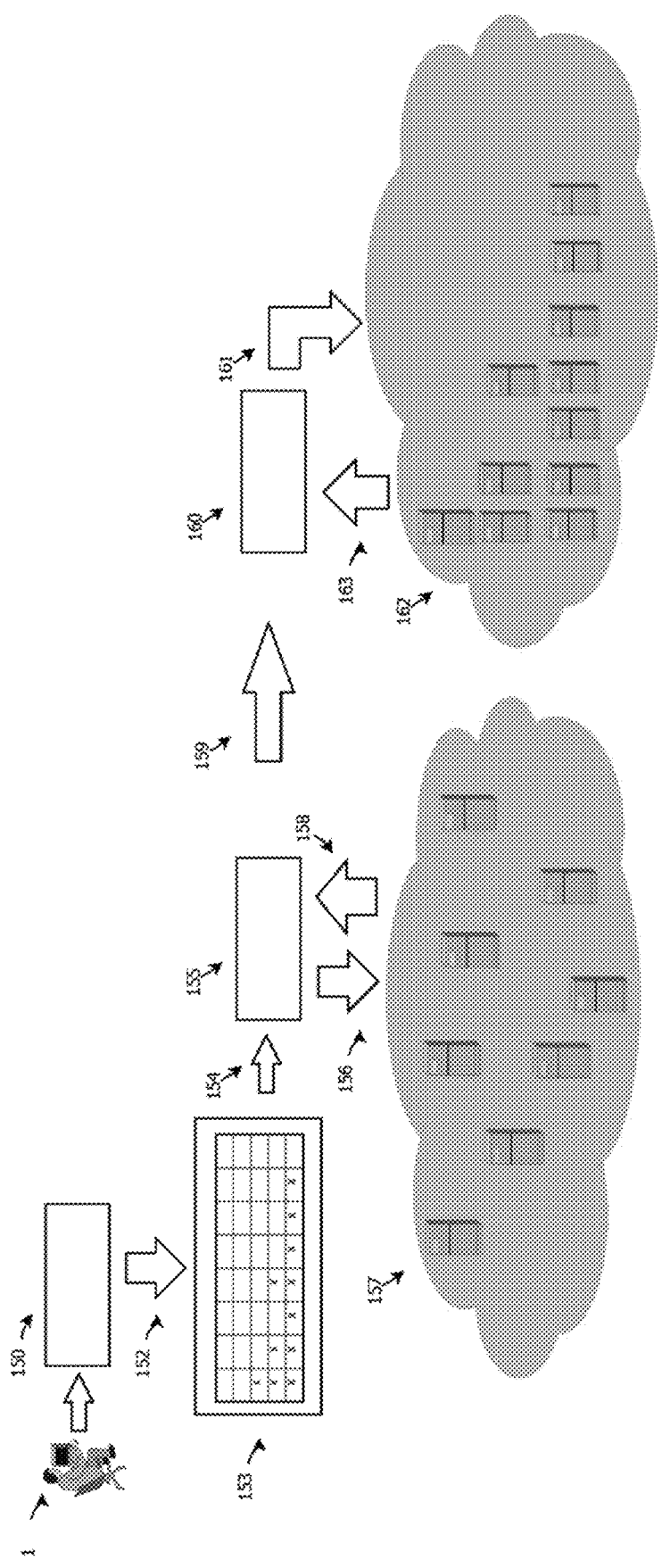
FIG. 11 shows a diagram depicting an overview of the process of execution mapping to physical server arrangement in accordance with the principles of the present invention.

FIG. 11 shows a diagram depicting an overview of the process of execution mapping to physical server arrangement. The process starts with a user submitting the execution program 20 to the terminal 1. The submitted execution program 20 goes through the a process 150 that represents the execution manager 22 going through a flow 152 of generating the execution matrix 24 depicted as a map 153 as described in FIG. 6. The map 153 will go to execution engine 28 depicted as an element 155 that does a hardware query 156 to a not configured cloud environment 157 through hardware software module 33 that contains the necessary routines to interact with hardware 34 and gets a capability a hardware capability message 158. The element 155 with through the execution engine coordinator 30 then establishes a communication 159 to the hardware selector 31 depicted as element 160. The element 160 then goes through the process described in FIG. 9 in a configuration flow 161 to convert the not configured cloud environment 157 into a configured cloud environment 162 and a return status 163. The process consisting of element 160 configuration flow 161 to convert the not configured cloud environment 157 into configured cloud environment 162 and return status 163 is repeated until the optimal configuration between the hardware 34 and execution matrix 24 achieves optimal status.

Figure 12:
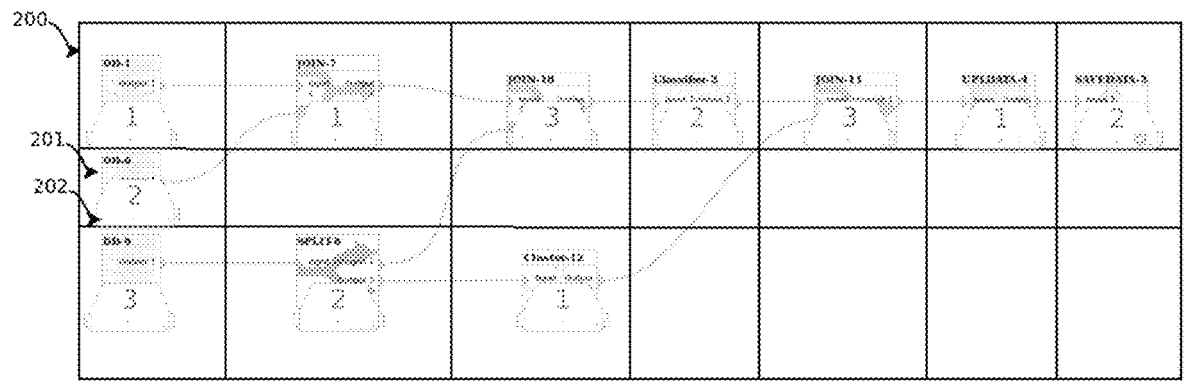
FIG. 12 presents the graphical representation of an execution flow that has a functionality icon that is superimposed with a computer hardware icon.

FIG. 12 presents the graphical representation of an execution flow 200 that has a functionality icon 201 that is superimposed with a computer hardware icon 202. This represents an alternative representation of the graphical execution map 61 with the addition of the hardware match carried out by the process shown in FIG. 9.

Figure 13:
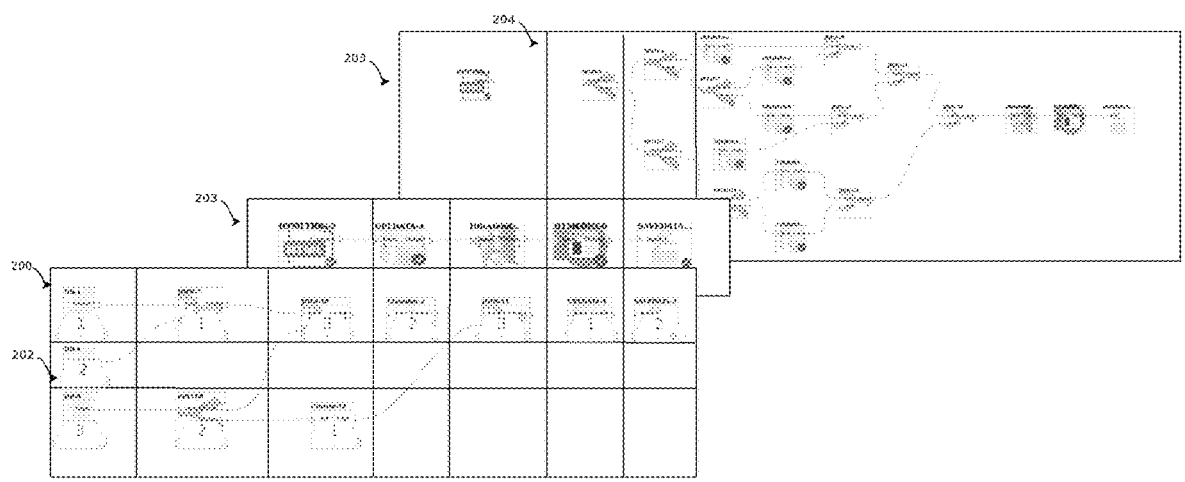
FIG. 13 shows the graphical representation of multiple concurrent model flows being overlaid for parallel execution.

FIG. 13 shows the graphical representation of multiple concurrent model flows being overlaid for parallel execution.

Figure 14:
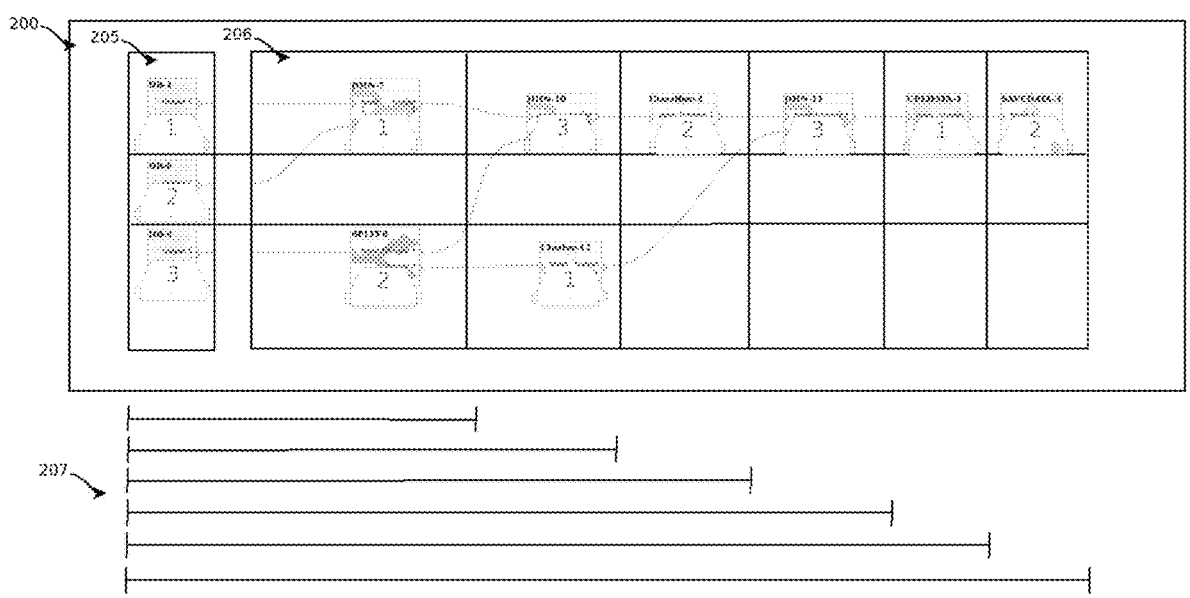
FIG. 14 shows an execution flow with the current executing slice and a residual execution grid map with a representation of an execution prediction time window.

FIG. 14 shows an execution flow 200 where the executing segment is shown as a current executing slice 205 and is separated from a residual execution grid map 206. FIG. 14 also shows a representation of multiple execution prediction time windows 207 from which the platform will select the most appropriate one to perform the arrangement of elements based on the method and process under the current disclosure. The selection is aimed to proceed from the biggest time window to the smallest time window.

Figure 15:
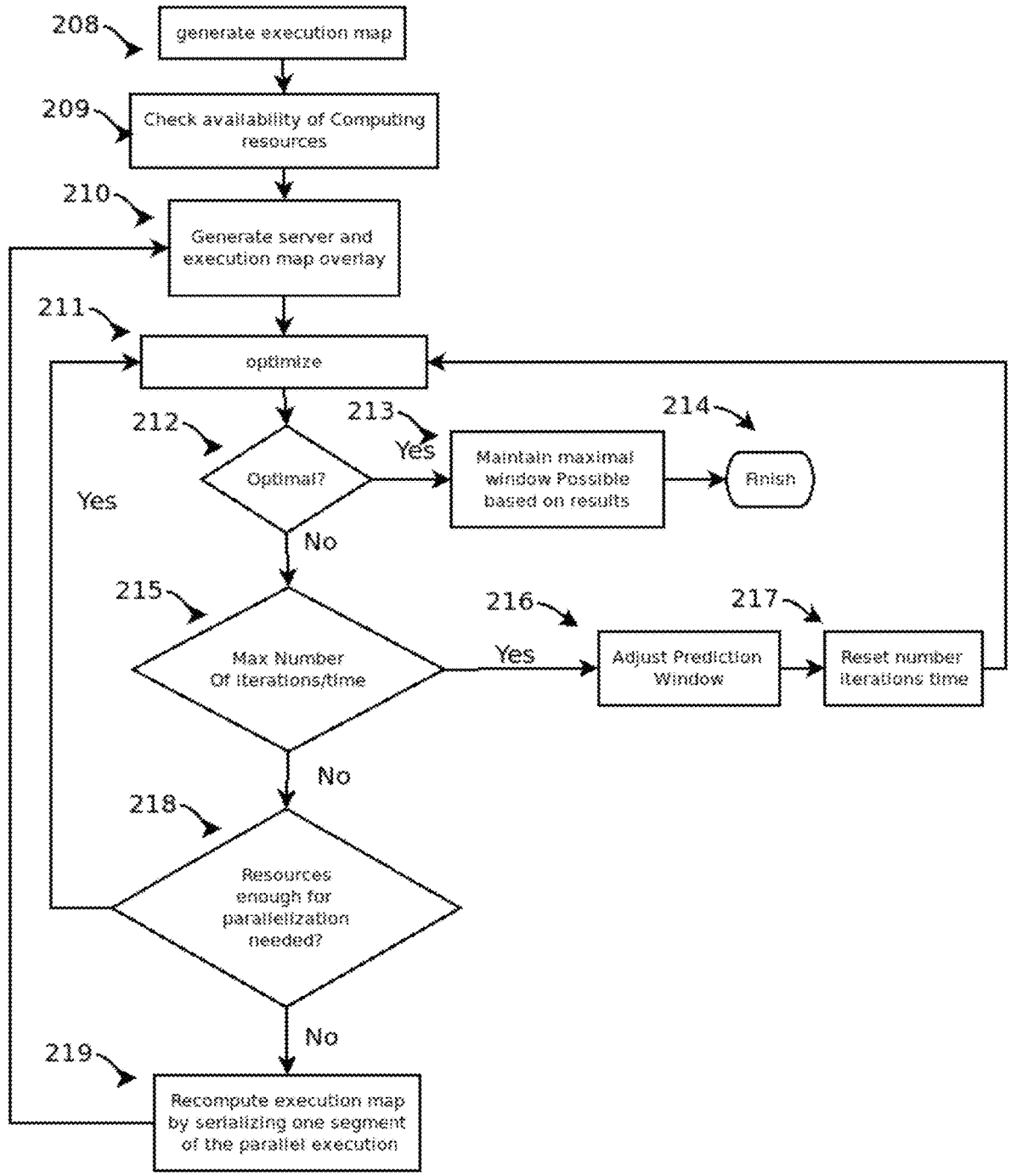
FIG. 15 shows a flowchart of the optimization with alternatives of initial flow serialization and adjustment window.

FIG. 15 shows a flowchart of the optimization with alternatives of initial flow serialization and adjustment window. The flow starts with a step 208 that comprises of the generation of an execution map 23 which is based on the execution program 20. Once the step 208 is completed a step 209 corroborates the availability of available computing resources. For example, the process step checks the number of servers, GPU capability, Multi-threading capability, memory capacity per resource, hard disk type and RPMs if applicable among other aspects of the computational resource specifications. The step 209 is followed by a step 210 that generates the server and execution map overlay as depicted graphically in FIG. 12. Once the step 210 is finished a step 211 carries out the initial optimization of rearranging the flow and the number of servers according to a minimization of a cost function. The optimization flow is carried out according to the flowchart depicted in FIG. 9. A step 212 evaluates if the process carried out in step 211 is optimal. If the results of the evaluation of step 212 is positive based on minimizing the cost function and meeting expected optimal expectations to a step 213 where the process maintains the chosen maximal window possible and code and server arrangement. Once step 213 is finished then the process concludes at a step 214. Step 212 can also lead to a negative evaluation of the optimization alternative resulting on a step 215 that evaluates if the maximum number of iterations or computational time has been met for the optimization process stage. If the maximum number of iterations or computational time is met step 215 is followed by a step 216 that adjust the prediction window 207. The adjustment of prediction time windows 207 moves from the biggest selected time window to a smaller time window. The time window corresponds to a time slice dictated by the vertical line 55. Once step 216 adjusts the time window a step 217 resets the number of iterations or computational time and redirects the process flow to step 211. Step 215 can also move to a step 218 based on a negative evaluation. Step 218 makes the determination if the resources available are enough for the parallelization that the execution map of the flow requires. If the flow determines that parallelization can be carried out with the resources available then it redirects the process flow to a step 211. If the resources needed are determined to be insufficient in step 218, then the process moves to a step 219 where the execution map is recomputed by serializing one of the parallel processes in the flow. In an embodiment of the present invention the serialization will be carried out in the parallel process closest to the current executing slice 205 with the objective of avoiding the need to shrink the prediction time windows 207. Once the step 219 is completed the process returns to step 210 to generate the server and execution map overlay and start the process of optimization again until a successful completion is achieved in the algorithm by arriving at step 214. The outcome of the process is selected as the optimal configuration of servers and code execution to be carried out by the rest of the process.

Figure 16:
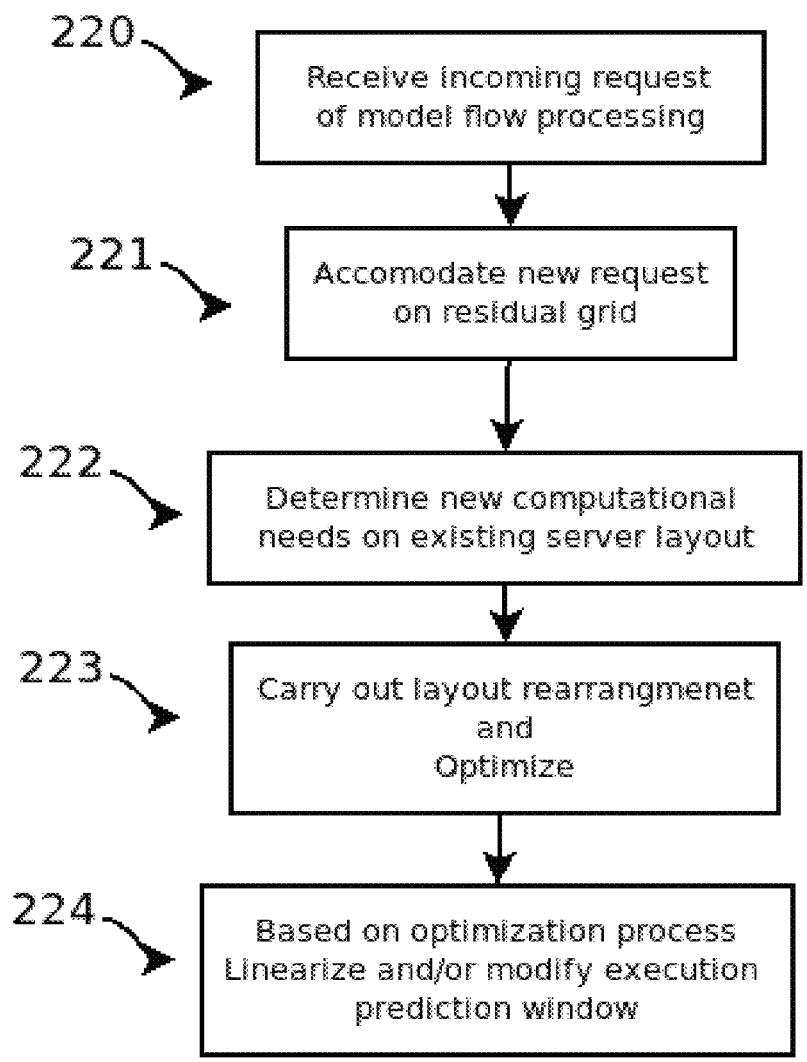
FIG. 16 is a block diagram of incoming flows and how to accommodate them on the flowchart of FIG. 15.

FIG. 16 is a block diagram of incoming flows and how to accommodate them on the flowchart of FIG. 15. The process of FIG. 16 starts with a step 220 where the execution manager 22 receives a new incoming request to process a model flow while processing already existing model flows. The process proceeds with a step 221 where the new model flow for processing is overlaid over the residual grid 206. An alternate embodiment might also align the first time slice of the incoming request with the current executing slice 205. Step 221 is followed by a step 222 where the computational needs are estimated. From step 222 a Step 223 then carries out the optimization process on the compound execution map according to the flowchart of FIG. 9 are carried out not just with the executing model but also with the incoming request. In addition to step 223 a step 224 is also carried out using the process of FIG. 15.

Figure 17:
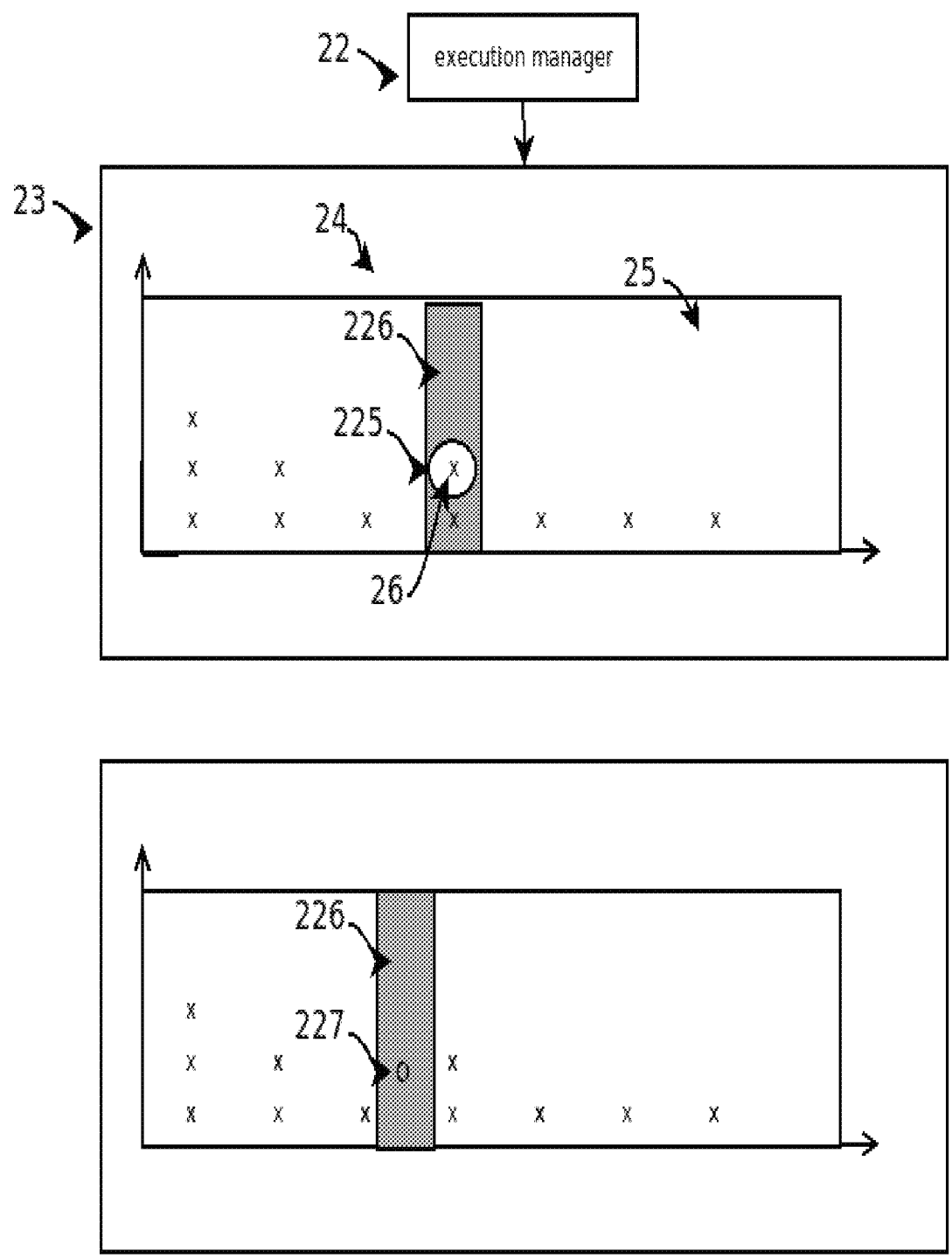
FIG. 17 is a graphical representation of an execution map that encounters and execution error.

FIG. 17 is a graphical representation of an execution map that encounters and execution error. The execution manager 22 during the processing of an execution map 23 can detect an error 225 corresponding to an execution entry 26 on a time slice 226. The moment the execution engine detects the error it will freeze the execution by halting the processing of that time slice and inform the user. In the present embodiment the user can modify the pattern by adding an additional computational step 227 to correct the mistake and move the execution time slot to the point where the addition is taking place. In an alternate embodiment the user can modify an existing computational step to correct the error detected by the execution manager 22.

Figure 18:
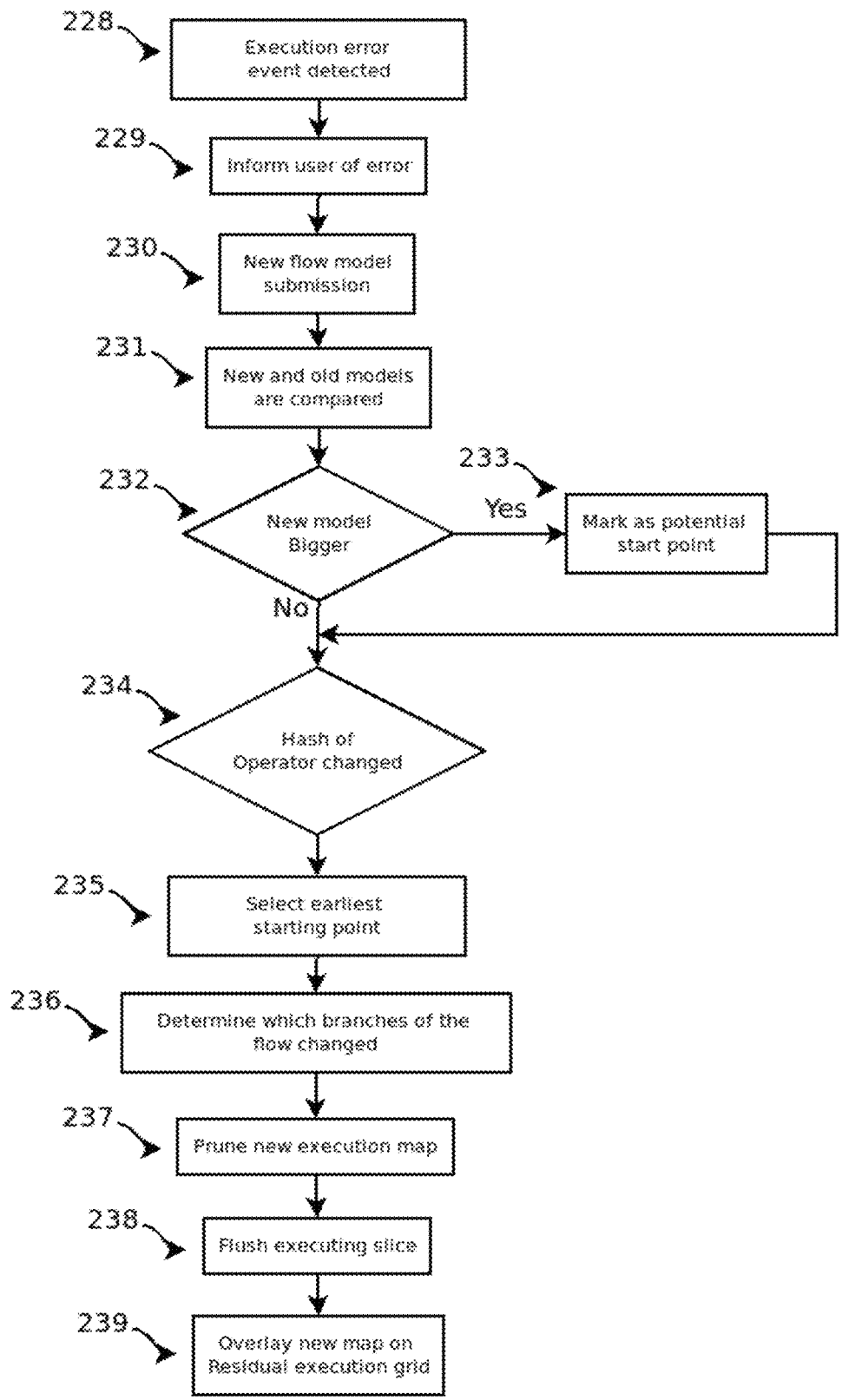
FIG. 18 is a flowchart on how the optimization upon execution restart after error.

FIG. 18 is a flowchart on how the optimization upon execution restart after error. The process starts with a step 228 where an execution error is detected and the execution engine freezes the execution based on information provided by the execution engine coordinator 30 and controller 27. Following the step 228 a step 229 informs the user of the error allowing for the user to know where the error resides and allows the user to correct the error. Once the user corrects the error as per the report of step 229 a step 230 begins with the submission of a new process flow model map by the user to the execution manager 22. The new process flow model submitted by the user in step 230 is then used in a step 231 to compare the old model that has the error with the new model submitted. This step is carried out using the execution map 23 of the old and new flow model maps generated by the execution manager 22. The comparison of step 231 is used in a decision step 232 where the old flow model map is compared to the new flow model map to see if the new flow model map is bigger than the old model map. The comparison of step 232 implies that a new operator 35 has been added to the execution map. If the decisional process of step 232 is evaluated positive then in a step 233, the new operator added to the flow model map is taken as the potential re-execution starting point for the flow model execution map. After step 233 or a negative outcome of step 232 the process continues to a step 234 that corroborates all the hashes from the configuration files in common between the new and the old flow model map to determine deletions or changes to the execution map 23 (i.e. flow model map). From step 234 a step 235 determines if the added operators of step 233 or the detected operators that were detected as changed is the earliest element in the execution map on which to base the starting point of re-execution. Once the earliest execution element has been established, then a step 236 determines which of the parallel branches have not been affected and already executed and mark them as finished in a step 237. Once step 237 is carried out, a step 238 flushes the executing slice marked for re-execution in the current executing slice 205 and the residual execution grid map 206 is updated in a step 239 with the new execution map that represents the new process flow model submitted by the user in step 230.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed:

1. A system for validation and optimization of a computer process execution workflow based on an environment evaluation standard, comprising:
   at least one processor;
   at least one memory module;
   an environment evaluation standard comprising performance validation parameters;
   a module for a graphical interface comprising a configuration of a plurality of functionality icons, a configuration of a plurality of hardware icons, and a plurality of execution time window predictions, wherein each functionality icon represents a process to be executed and each hardware icon represents device used to execute a process;
   wherein said functionality icons comprise a set of input/output constraints compliant with said performance validation parameters;
   an execution manager module, wherein said execution manager module generates a first execution map comprising execution slots based on said configuration of a plurality of functionality icons and said configuration of a plurality of hardware icons;

a controller module, wherein said controller module is configured to be connected to a computing environment;

wherein said execution manager module rearranges said configuration of a plurality of functionality icons on particular execution slots to maximize overall execution performance of said first execution map based on the hardware resources available in said computing environment and said input/output constraints;

wherein said controller module and computing environment coordinate the execution of said first execution map based on the hardware resources available in said computing environment and said input/output constraints;

wherein said execution of said first execution map is carried out based on a determination of compliance with said environment evaluation standard;

wherein said plurality of execution time window predictions is modified based on said determination of compliance with said environment evaluation standard; and wherein said execution manager regenerates said first execution map by serializing the process to be executed represented by said plurality of functionality icons that is closest to the currently executing process represented by said plurality of functionality icons in a parallel fashion.

2. The system as in claim 1, further comprising:
an error detection and notification module;
a second execution map comprising modifications by a user to fix an error;
wherein, said execution map is compared with said second execution map;
wherein said execution manager module generates a third execution map based on said comparison of said first and second execution maps;
wherein said controller module and computing environment coordinate the execution of said third execution map based on the hardware resources available in said computing environment and said input/output constraints; and
wherein said execution of said third execution map is carried out based on a determination of compliance with said environment evaluation standard.

3. The system as in claim 1, wherein said module for a graphical interface is configured to allow a user to manually override the execution coordinated by said controller and cloud computing environment based on available empty execution slots on said execution map and the hardware resources available in said cloud computing environment.

4. The system as in claim 1, wherein said plurality of functionality icons comprises an operator including an input link connector and an output link connector.

5. The system as in claim 1, wherein said plurality of functionality icons comprises an operator including an output link connector representing a source operation.

6. The system as in claim 1, wherein said plurality of functionality icons comprise an operator including an input connector representing a destination operation.

7. The system as in claim 1, wherein said plurality of functionality icons comprise an operator including an input link connector and two output link connectors representing a split operation.

8. The system as in claim 1, wherein said plurality of functionality icons comprise an operator including an output link connector and two input link connectors representing a join operation.

9. A method for validation and optimization of a computer process execution workflow based on an environment evaluation standard, comprising the steps of:
manually establishing a configuration for an execution order of a plurality of functionality icons, a configuration of a plurality of hardware icons, by establishing links between them and plurality of execution time window predictions, wherein each functionality icon represents a process to be executed and each hardware icon represents device used to execute a process;
calculating the number of said functionality icons, hardware icons, and said links;
generating an empty multi-dimensional array map;
isolating terminator processes from said plurality of functionality icons;
generating an array comprising said isolated terminator processes;
generating an array comprising the non-terminator processes from said plurality of functionality icons;
pushing said array of isolated terminator processes into said array map;
traversing said array comprising the non-terminator processes from said plurality of functionality icons by:
initializing a first dimension size of said array comprising the non-terminator processes to 1;
comparing an array map counter to said first dimension size;
determining a second dimension size of the first dimension coordinate that corresponds to said array map counter;
comparing said second dimension size to a second dimension counter;
determining the predecessor and successor dependencies of the functionality icon that corresponds to said first dimension coordinate and said second dimension counter;
generating a temporary array comprising the process corresponding to the functionality icon that corresponds to said first dimension coordinate and said second dimension counter;
pushing said temporary array into said array map;
inverting said execution array map so that it can be read from beginning to end; and
modifying said plurality of execution time window predictions based on said execution array map's compliance with said environment evaluation standard.

10. The method as in claim 9, wherein said plurality of functionality icons comprises an operator including an input link connector and an output link connector.

11. The method as in claim 9, wherein said plurality of functionality icons comprises an operator including an output link connector representing a source operation.

12. The method as in claim 9, wherein said plurality of functionality icons comprises an operator including an input connector representing a destination operation.

13. The method as in claim 9, wherein said plurality of functionality icons comprises an operator including an input link connector and two output link connectors representing a split operation.

14. The method as in claim 9, wherein said plurality of functionality icons comprises an operator including an output link connector and two input link connectors representing a join operation.

15. The method as in claim 9, further comprising the steps of;

generating a second execution array map comprising modifications by a user to fix an error;

comparing said execution array map with said second execution array map;

generating a third execution array map based on said comparison of execution array maps;

coordinating the execution of said third execution array map;

wherein said execution of said third execution array map is carried out based on a determination of compliance with said environment evaluation standard.

* * * * *